(12) United States Patent
Wilcher et al.

(10) Patent No.: US 6,997,328 B2
(45) Date of Patent: Feb. 14, 2006

(54) GRIT REMOVAL ASSEMBLIES

(75) Inventors: Stephen B. Wilcher, Harleysville, PA (US); Robert Slaby, Emmaus, PA (US)

(73) Assignee: USFilter Corporation, Warrendale, PA (US)

( * ) Notice: Subject to any disclaimer, the term of this patent is extended or adjusted under 35 U.S.C. 154(b) by 0 days.

(21) Appl. No.: 10/640,420

(22) Filed: Aug. 13, 2003

(65) Prior Publication Data
US 2005/0035056 A1    Feb. 17, 2005

(51) Int. Cl.
*B01D 21/24* (2006.01)

(52) U.S. Cl. ............... 210/519; 210/521; 210/523; 210/532.1

(58) Field of Classification Search ............... 210/519, 210/521, 522, 532.1, 523
See application file for complete search history.

(56) References Cited

U.S. PATENT DOCUMENTS

| | | | |
|---|---|---|---|
| 545,026 A * | 8/1895 | Smith .......................... 210/519 |
| 1,762,593 A | 6/1930 | Schwarz |
| 2,118,157 A * | 5/1938 | Camp .......................... 210/519 |
| 3,933,654 A * | 1/1976 | Middelbeek ................. 210/521 |
| 4,042,512 A * | 8/1977 | McCarthy et al. .......... 210/519 |
| 4,064,054 A * | 12/1977 | Anderson et al. ........... 210/521 |
| 4,072,614 A | 2/1978 | Harris |
| 4,351,733 A * | 9/1982 | Salzer et al. ................. 210/521 |
| 4,422,931 A * | 12/1983 | Wolde-Michael ......... 210/532.1 |
| 4,722,800 A * | 2/1988 | Aymong ...................... 210/519 |
| 4,871,449 A | 10/1989 | Lott |
| 4,886,605 A * | 12/1989 | Herve .......................... 210/519 |
| 5,021,153 A | 6/1991 | Haws |
| 5,326,474 A | 7/1994 | Adams et al. |
| 5,378,375 A | 1/1995 | Bache |
| 5,505,860 A * | 4/1996 | Sager .......................... 210/519 |
| 5,520,825 A * | 5/1996 | Rice ............................ 210/519 |
| 5,605,636 A * | 2/1997 | Wyness ....................... 210/521 |
| 5,643,443 A | 7/1997 | Ishikura |
| 5,714,069 A | 2/1998 | Sager |
| 6,120,684 A | 9/2000 | Kistner et al. |
| 6,350,374 B1 | 2/2002 | Stever et al. |
| 6,395,181 B1 | 5/2002 | Mullerheim |
| 2001/0027954 A1 * | 10/2001 | Broeders et al. ............ 210/519 |

* cited by examiner

*Primary Examiner*—Christopher Upton

(57) ABSTRACT

An assembly for removing grit from a fluid comprising a tank with a fluid inlet into the tank and a discharge from the tank. A flow directing assembly is positioned in the tank adjacent the fluid inlet and includes a substantially U-shaped surface opposite the fluid inlet such that fluid entering the tank through the inlet is caused to have a reversed flow in a direction more than 90 degrees from an inlet flow direction. At least one embodiment of the assembly further comprises a baffle positioned proximate the tank discharge to control flow adjacent the discharge. Yet a further embodiment of the assembly includes a screw conveyor positioned in a trough of the tank and a baffle is positioned proximate the trough to minimize fluid flow velocity adjacent to the screw conveyor.

14 Claims, 7 Drawing Sheets

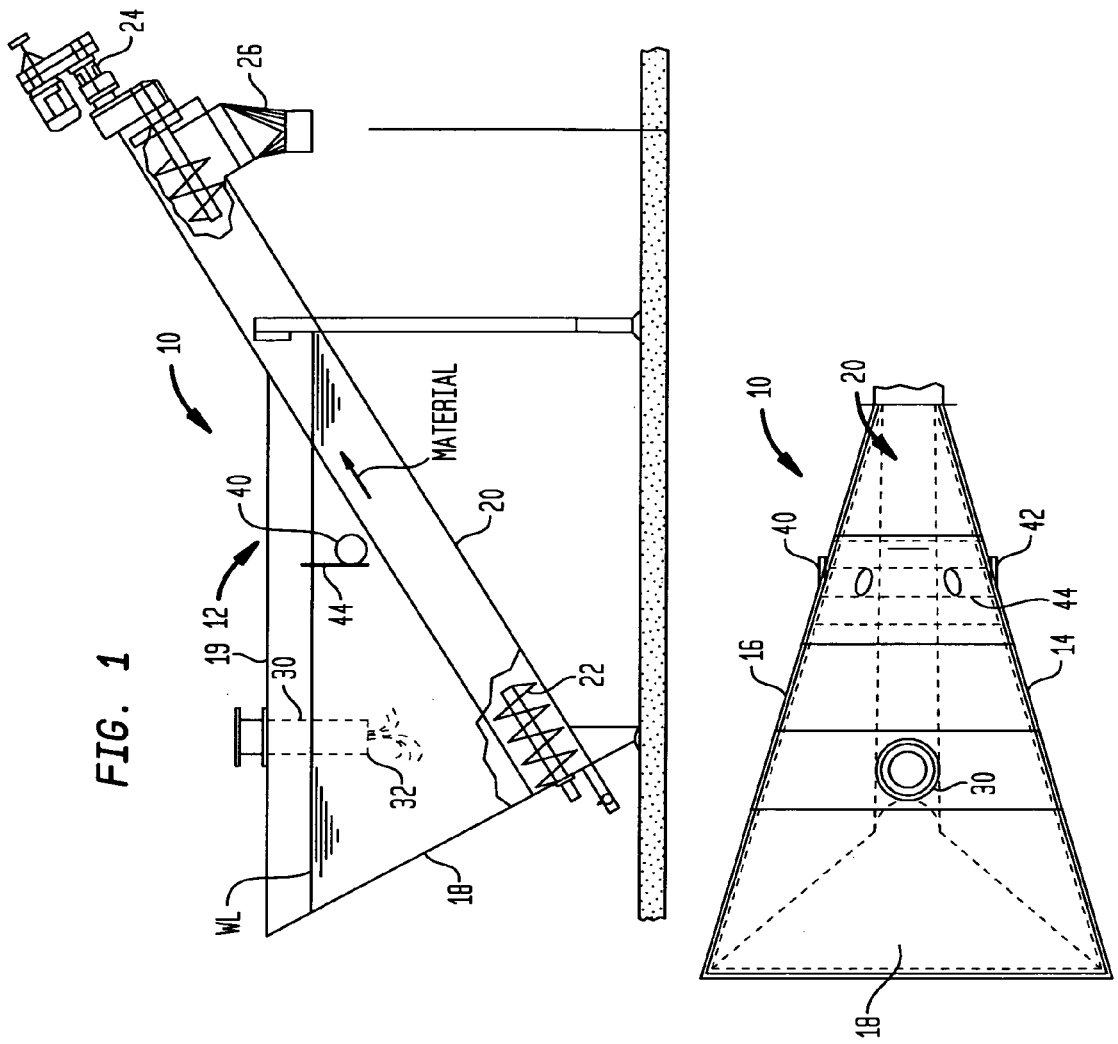
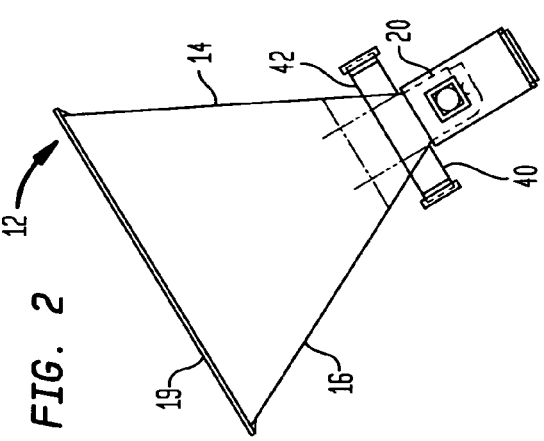
FIG. 1
FIG. 2
FIG. 3

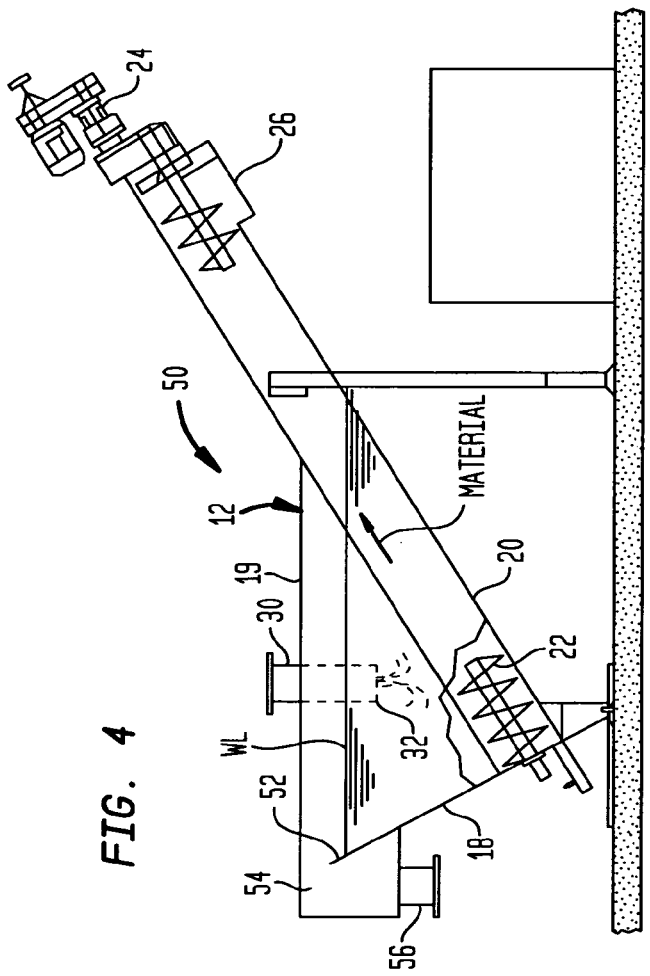
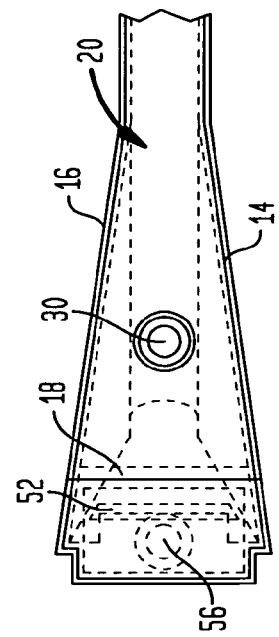
FIG. 4
FIG. 5

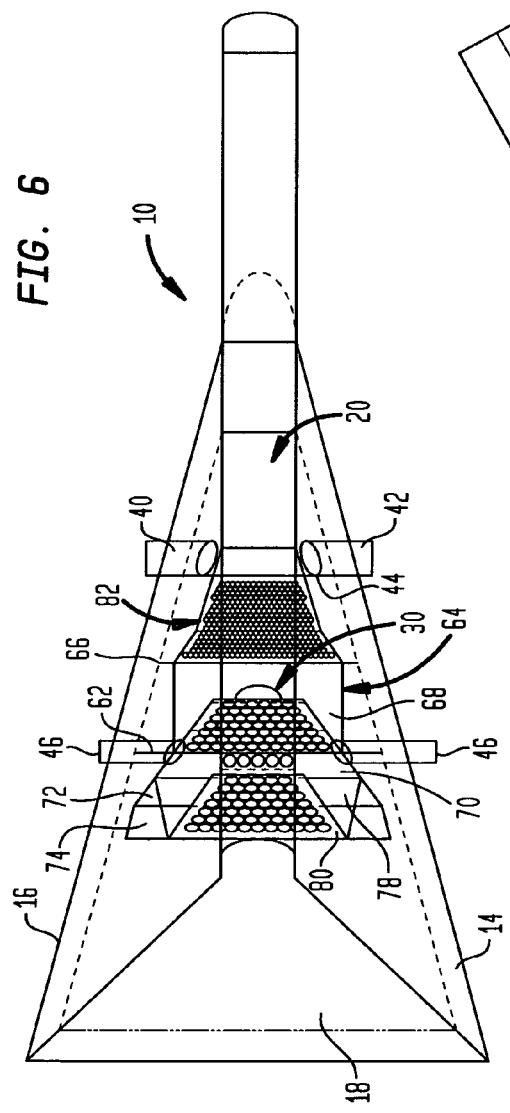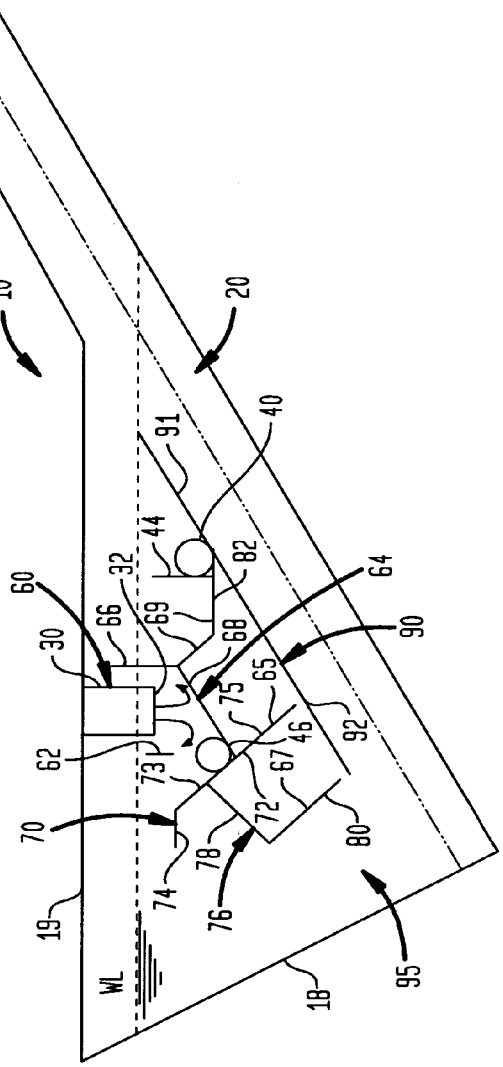

GRIT REMOVAL ASSEMBLIES

BACKGROUND

All wastewater treatment facilities generally utilize grit handling and removal equipment to isolate and/or remove the harmful coarse solids contained in the waste stream flow and eliminate them from downstream processes. Utilizing this equipment also aids in reducing maintenance costs and grit related operational difficulties. This includes protecting sludge pumps, piping, centrifuges, etc., from the scouring action of grit, and preventing grit from reducing a plant's overall efficiency due to clogged sumps and pipes in addition to build-ups in fluid channels, settling basins, flocculation tanks and digestion tanks.

Grit contained in grit slurries, whether removed by mechanical means such as bucket elevators, airlifts, water eductors or pumps must be dewatered and washed to produce a product which is inoffensive and can be easily handled and removed from the facility. Two pieces of equipment were commonly used in plants for this purpose, grit washers and grit separators or classifiers.

SW grit washer units dewater and wash grit particles to a low putrescible content, primarily free of bacteria, fungi, foul smelling odors. These units were traditionally offered in various sizes related to maximum flow rate the units could handle and still provide effective solids separation and removal. The sizes were developed to handle the commonly captured grit size of 65 mesh, approximately 235 microns, or greater and utilized tank surface area and settling rate (related to tank detention time) methodology for sizing specific projects.

A second design called a SW-C grit washer allowed much higher flow rates to the washer unit by using a first stage cyclone grit separator to deliver the grit slurry to the washer. The SW tank sizes (5 GPM TO 40 GPM) could then remain smaller but the overall system could handle the higher flow rates. The overflow from the cyclone separation process is typically returned to the upstream process flow. Since the underflow from the cyclone is at a significantly lower flow rate of approximately 5–10% and has significantly higher grit content per gallon of flow, the tanks typically require additional make-up water to be added to enable proper washing.

Grit classifier units were designed to handle low to moderate solids loads in a slurry, which is being de-slimed, dewatered or washed. The surface area required to effect the desired separation determines the size of the tank. As slurry is discharged into the tank, the flow contained solids settle out of suspension and the clarified overflow passes over an adjustable weir into an effluent box. Again, tank sizes were originally based on handling grit sizes of 65 mesh or greater.

In both grit washers and grit classifiers, a screw is utilized to convey solids to a discharge point, and to agitate the fluidized bed of materials, releasing entrapped slimes for removal. Sizing of the screws and speeds utilized are dependent upon expected volumes of grit and capacity output as required by the application. Variable speed drive units are commonly utilized. Both designs targeted removing 95% of the grit contained within the slurry. Traditionally, these units only run about 15–20 minutes every 3 to 4 hours, with timing based upon how often the upstream process equipment flowing into the unit was set or required to run.

More recently, wastewater plants are requiring that smaller grit sizes of 100 mesh or even 150 mesh (approximately 149 to 96 microns, respectively) be removed from the influent waste stream, especially with Combined Sewer and Overflow (CSO) plants and combined systems becoming more prevalent. Plants have also dramatically cut back on the maintenance staffs, so the need to reduce maintenance efforts is increased. CSO systems deliver significantly higher flow at more common intervals and for longer periods of time. The very small grit particles such as 100 or 150 mesh are much more difficult to remove as they tend to stay suspended and do not settle out unless very large tank liquid volumes are utilized to allow enough detention time within the tank for separation to occur. Also over the last 10–15 years, Vortex grit separation has now moved into becoming the more commonly utilized first stage method to handle larger flows and smaller grit particles and is run generally on a continuous basis during storm events. What this has also done is to begin replacing the previously popular and commonly used grit cyclones as the first stage separator of the grit slurry. The Vortex systems typically preferred in CSO applications, do not have many of the problems associated with cyclones, such as routine plugging and rapid wear of the underflow (apex) end of the cyclone.

Without the use of cyclones, the inlet feed rates to the washers and classifiers can commonly become 200–400 GPM. In order to keep overall equipment (tank and screw) size within reasonable limits and to be able to handle the 100–150 mesh particles, a new design for both the classifiers and washers is desired.

SUMMARY

The present invention provides an assembly for removing grit from a fluid. The assembly comprises a tank with a fluid inlet into the tank and a discharge from the tank. A flow directing assembly is positioned in the tank adjacent the fluid inlet. The flow directing assembly includes a substantially U-shaped surface opposite the fluid inlet such that fluid entering the tank through the inlet is caused to have a reversed flow in a direction more than 90 degrees from an inlet flow direction. At least one embodiment of the assembly further comprises a baffle positioned proximate the tank discharge to control flow adjacent the discharge. Yet a further embodiment of the assembly includes a screw conveyor positioned in a trough of the tank and a baffle is positioned proximate the trough to minimize fluid flow velocity adjacent to the screw conveyor.

BRIEF DESCRIPTION OF THE DRAWINGS

FIGS. 1–3 are side, top and rear, respectively, plan views of an illustrative grit washer tank assembly useable with the present invention;

FIGS. 4 and 5 are side and top, respectively, plan views of an illustrative grit classifier tank assembly useable with the present invention;

FIGS. 6 and 7 are top and side, respectively, plan views of an a first embodiment of the present invention utilized with a grit washer tank assembly;

DETAILED DESCRIPTION OF THE PREFERRED EMBODIMENTS

Figure 8:
FIG. 8 is a front plan view of a plate that is part of the present embodiment of the present invention.

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Referring to FIGS. 1–3, an illustrative grit washer tank assembly 10 useable with the present invention is shown. The grit washer tank assembly 10 includes inwardly sloped side walls 14, 16 and an inwardly sloped rear wall 18. The side walls 14, 16 and the rear wall 18 are joined by a trough 20 extending from the rear wall 18 along the length of and beyond the side walls 14, 16. The trough 20 is configured to support a screw conveyor 22 therein. The screw conveyor 22 is driven by a motor 24 or other drive to move material along the trough 20 and out a discharge 26 near the forward end of the trough 20. The discharge 26 is aligned with a disposal mechanism (not shown), for example, a bin or a conveyor, to remove and dispose of the discharged material.

The grit washer tank assembly 10 includes a cover 19 extending over the tank 12. A fluid inlet pipe 30 extends through the cover 19 into the tank 12. Fluid to be washed flows through the inlet pipe 30 and enters the tank 12 at the pipe outlet 32. The inlet pipe 30 preferably extends sufficiently in to the tank 12 such that the pipe outlet 32 is below the water level WL in the tank 12. Discharge pipes 40 and 42 are provided on opposite sides of the tank 12 to discharge fluid that has been washed. A weir plate 44 is preferably positioned adjacent the discharge pipes 40, 42 to prevent suspended particles from flowing to the discharge pipes 40, 42.

Referring to FIGS. 4 and 5, an illustrative grit classifier tank assembly 50 useable with the present invention is shown. The grit classifier tank assembly 50 includes a tank 12 defined by walls 14, 16 and 18 and trough 20. A motor 24 driven screw conveyor 22 extends along the trough and moves material to a discharge 26. As with the washer assembly 10, an inlet pipe 30 extends through the cover 19 and discharges fluid through a pipe outlet 32 positioned below the water level in the tank 12. In distinction from the washer assembly 10, the grit classifier tank assembly 50 includes a discharge pipe 56 extending from a discharge box 54 adjacent the rear wall of the tank 18. A weir plate 52 extends adjacent the rear wall 18 to control flow into the discharge box 54.

The present invention includes a fluid directing assembly and can be utilized with both the grit washer tank assembly 10 and the grit classifier tank assembly 50. A first embodiment of the present invention utilized in conjunction with a grit washer tank assembly 10 will be described with reference to FIGS. 6–19.

Referring to FIGS. 6 and 7, the present invention includes a flow directing assembly 60 positioned adjacent the inlet pipe outlet 32 and a screw conveyor baffle plate 90. As described in conjunction with FIGS. 1–3, a weir plate 44 is positioned adjacent to the discharge pipes 40 and 42 and the inlet pipe outlet 32 is below the water level WL. As can be seen in FIGS. 6 and 7, the inlet pipe 30 is approximately centered, front to rear. Such positioning is forward the typical inlet position of prior art washer assemblies, and has been found to be more effective at providing a controlled flow within the tank 12.

The preferred flow directing assembly 60 includes a plurality of plates positioned within the tank to direct flow of the fluid within the tank 12. As will be described, several of the plates are interconnected, and may be formed as individual components connected to one another, for example, via bolting, welding or the like, or may be formed from a single sheet bent or otherwise contoured to define the various plates, or a combination of both.

A plate 62, illustrated in FIG. 8, extends between the side walls 14 and 16 and provides a solid surface substantially parallel to the inlet pipe 30. Plate 62 extends from above the pipe outlet 32 to below the pipe outlet 32, thereby preventing direct horizontal, rearward flow from the pipe outlet 32.

Figure 9:
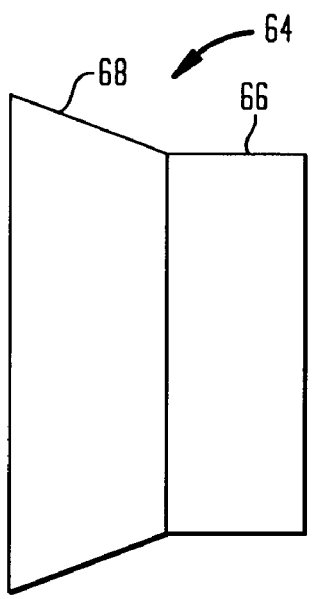
FIGS. 9 and 10 are surface and end, respectively, plan views of another plate of the present embodiment of the present invention.
Figure 10:
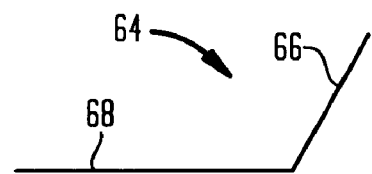

A plate 64 is positioned adjacent the pipe outlet 32 and is illustrated in FIGS. 9 and 10. The plate 64 includes first and second portions 66 and 68, each having a solid surface. The first portion 66 is configured to extend between the side walls 14 and 16, substantially parallel to the inlet pipe 30 and opposite of plate 62. First portion 66 preferably extends from above the water line WL to below the pipe outlet 32, thereby deterring direct fluid flow toward the front of the tank 12. The second portion 68 extends from the first portion 66 at an angle thereto. The second portion 68 is preferably angled such that portion 68 is angled, rather than parallel, to the pipe outlet 32.

Figure 11:
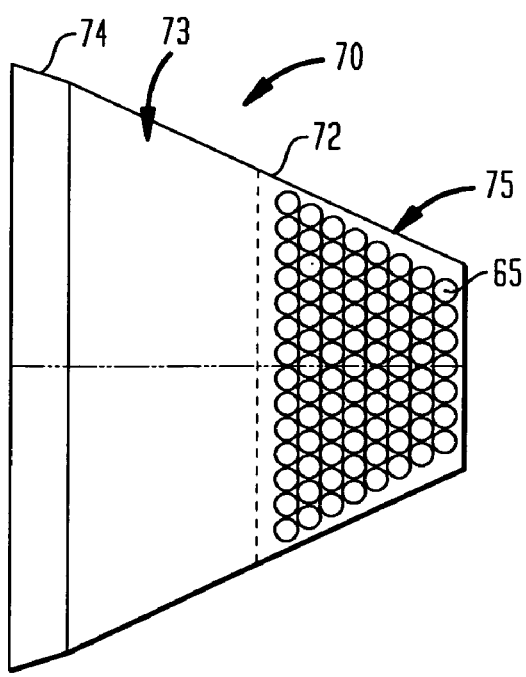
FIGS. 11 and 12 are surface and end, respectively, plan views of another plate of the present embodiment of the present invention.
Figure 12:
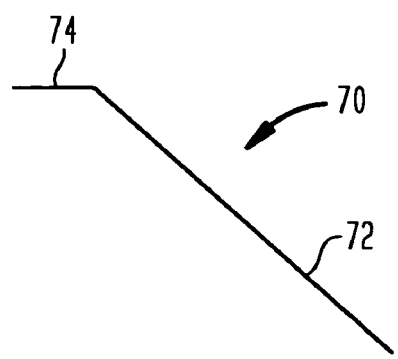

The opposite end of the second portion 68 is connected to an angled portion 72 of a rearward extending plate 70. The rearward extending plate 70 is illustrated in FIGS. 11 and 12. The rearward extending plate 70 includes the angled portion 72 and a horizontal portion 74 extending therefrom. The horizontal portion 74 extends substantially parallel to and below the water level WL to define a rearward path for the fluid flow. As shown in FIG. 11, the angled portion 72 includes an the upper solid portion 73 and a lower portion 75. The interconnection line of plate portion 68 is shown in phantom in FIG. 11. As can be seen from FIGS. 7 and 11, the portion 73 of angled portion 72 above the interconnection with plate portion 68 is solid.

Figure 18:
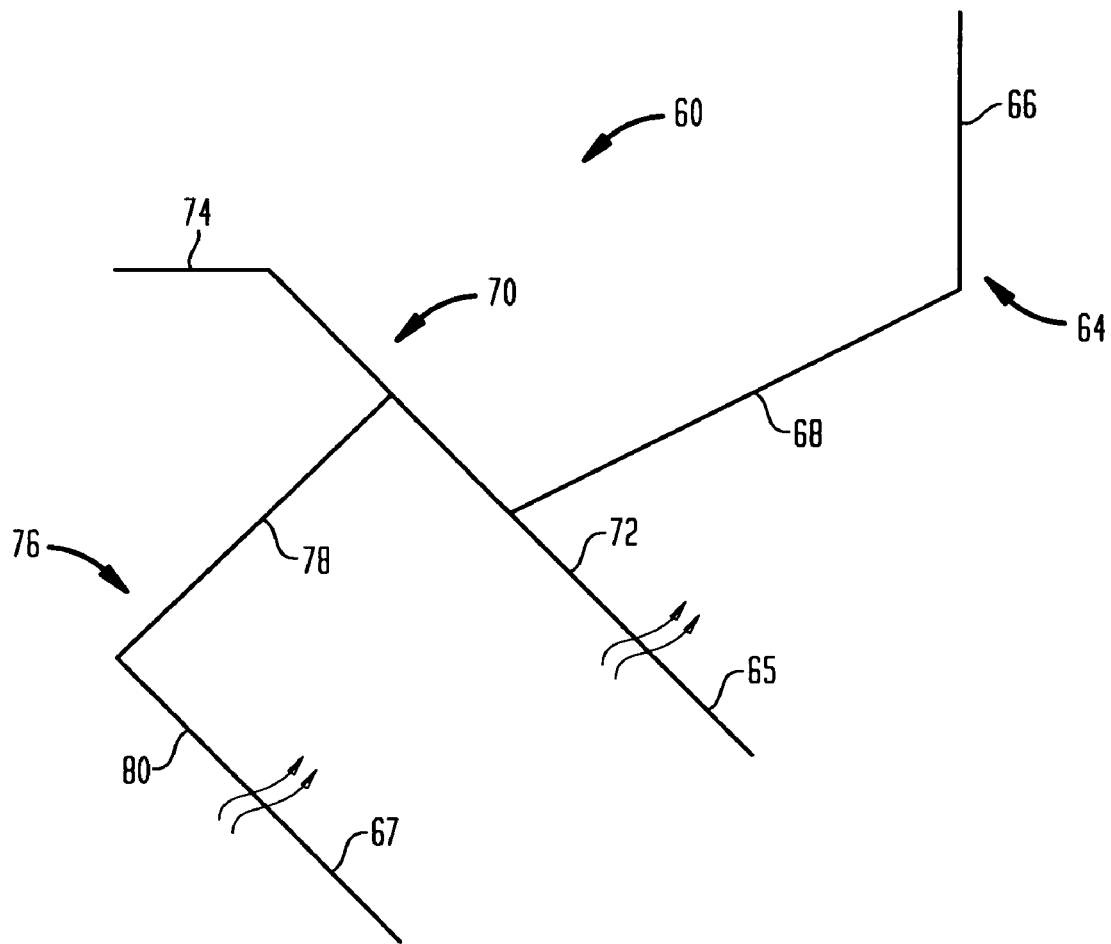
FIG. 18 is an end plan view of the flow directing assembly of the present embodiment of the present invention.

As such, portions 66, 68, 73 and 74, which are all solid as illustrated by the thick solid line in FIG. 18, define a substantially U-shaped solid surface into which flow from the pipe outlet 32 is directed. Flow into the U-shaped solid surface causes the fluid to be rapidly redirected upward and outward, causing a rolling action in the fluid, with the majority of the fluid being forced to flow toward the rear, larger portion of the tank 12.

The inlet pipe 30 is preferably sized to provide an inlet flow velocity into the U-shaped flow directing area within a desired range, for example, between 2.5 and 3 ft/sec. The inlet velocity range is selected such that the flow is sufficiently slow to allow a short period of fluid retention in the flow directing area to allow separation to begin, but fast enough to prevent substantial material settling inside the solid U-shaped flow directing area. While material will generally not settle in the U-shaped flow directing area during operation, some material may settle, for example, during shutdown. As such, clean out pipes 46 preferably extend in to the tank 12 within the U-shaped flow directing area, as shown in FIGS. 6 and 7. The clean out pipes 46 are capped or otherwise plugged during normal operation.

Figure 13:
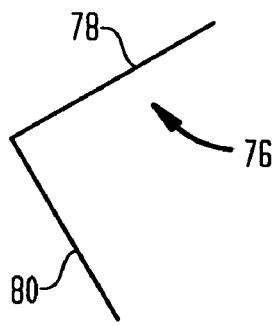
FIGS. 13–15 are end and opposite surface, respectively, plan views of another plate of the present embodiment of the present invention.
Figure 14:
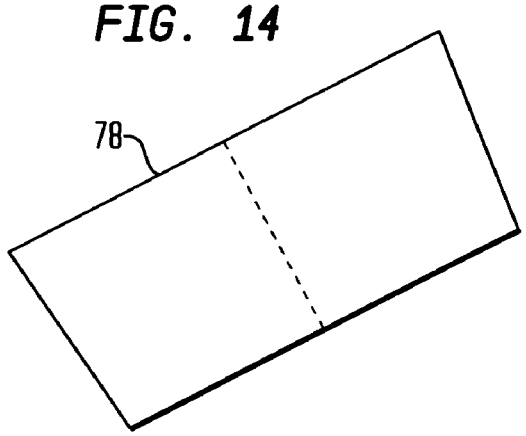
Figure 15:
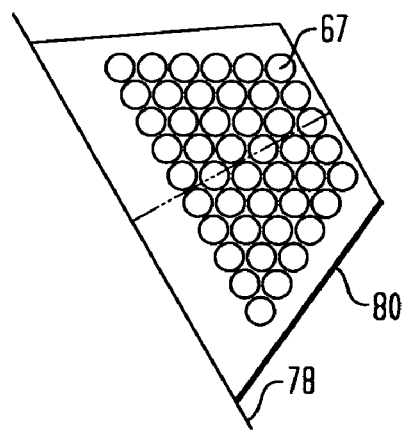

Plate 76, illustrated in FIGS. 13–15, extends from rearward plate 70, with an upper solid portion 78 and a downward extending portion 80. The solid upper portion 78 helps to maintain the rolling flow in the upper portion of the tank 12 for a longer period.

Figure 16:
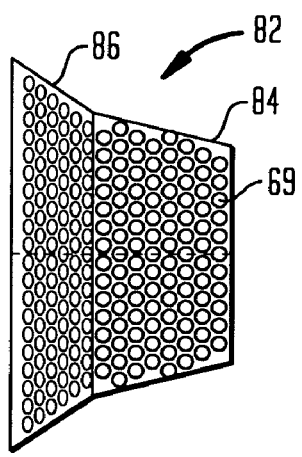
FIGS. 16 and 17 are surface and end, respectively, plan views of a discharge baffle of the present embodiment of the present invention.
Figure 17:

Referring to FIGS. 11 and 15, the lower portion 75 of angled plate portion 72 and the downward extending portion 80 of plate 76 include a plurality of through holes 65, 67, respectively. The through holes 65 and 67 allow fluid to flow toward the discharge pipes 40 and 42, but in a controlled manner. Furthermore, fluid contact with the plate portions 80 and 75 causes additional separation of any materials that may remain suspended in the fluid. A discharge baffle 82, illustrated in FIGS. 16 and 17, provides two portions 84 and 86 with through holes 69 adjacent to the discharge pipes 40 and 42. Again, through holes 69 allow controlled flow to the discharge pipes 40, 42 while fluid contact with the plate portions 84 and 86 provides additional separation. The configuration of the discharge baffle 82, including the size of the through holes 69, is selected to control the flow velocity to the discharge pipes 40, 42. The flow velocity at the discharge pipes 40, 42 is preferably greater than the flow velocity in the quiescent zone 95 of the tank 12, as will be described hereinafter.

Figure 19:
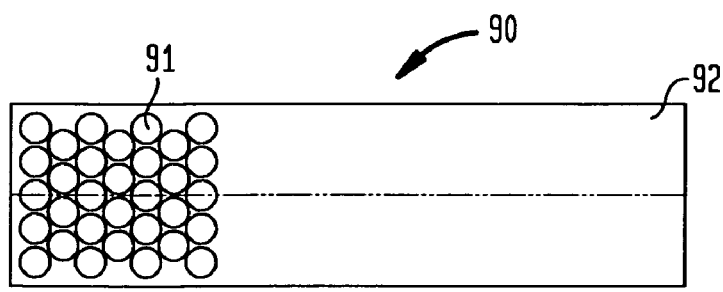
FIG. 19 is a top plan view of a screw conveyor baffle of the present embodiment of the present invention.

Screw conveyor baffle plate 90 extends below the flow directing assembly 60, above the screw conveyor trough 20. Referring to FIG. 19, the screw conveyor baffle plate 90 includes a portion with a plurality of through holes 91 and a solid portion 92. The screw conveyor baffle plate 90 is positioned such that through holes 91 are proximate the plate portions 72 and 80. As such, the rolling flow in the rear of the tank 12 can flow through the holes 91 toward the discharge pipes 40, 42. The solid portion 92 covers the screw conveyor 22 adjacent to the discharge pipes 40, 42, thereby preventing the turbulent flow proximate the discharge pipes 40, 42 from disturbing the material being conveyed by the screw conveyor 22. In view of the smaller material size, 100 to 150 mesh, it has also been found to be beneficial to reduce the flight clearance of the screw conveyor 22, for example, to approximately one-quarter inch.

The forced flow patterns and rolling action caused by the flow directing assembly 60 causes the inlet flow momentum to disperse rapidly. The flow directing assembly 60, the plates with through holes 65, 67, 69, 91 and the baffle plate 90, positioned properly in the tank provides a quiescent zone 95 with flow velocities within established target ranges which allows settling of finer mesh materials to take place in the bottom rear of the tank. Additionally, the target velocities allow the screw conveyor 22 to remove the settled grit particles without disruption caused by high velocity or turbulence in the screw conveyor removal zone.

For example, the target velocity for removing 100 mesh particles is 0.35 ft/sec while the target velocity for removing 150 mesh particles is 0.25 ft/sec. The flow directing assembly 60, the plates with through holes 65, 67, 69, 91 and the baffle plate 90 allow the target velocities to be achieved to allow desired separation without the washer assembly 10 being dependent upon large surface areas to diffuse the inlet velocity. The flow directing assembly 60 creates the desired flow pattern with the desired flow velocities. A tank 12 with a sufficient depth will provide the appropriate quiescent zone 95 to allow separation at the slower flow velocities. For example, a tank 12 including a flow directing assembly 60 and having a rear depth of 48 inches has been found sufficient to separate 100 mesh material at 200 GPM. The flow directing assembly 60 and baffles allow separation to be achieved while utilizing smaller tank volumes. For example, a tank including a flow directing assembly 60 and a volume of 160 gallons has been found sufficient to separate 100 mesh material at 200 GPM. The depths and volumes are for example purposes only and may be adjusted based on numerous variables, including particle size and flow rates.

Figures 20, 21:
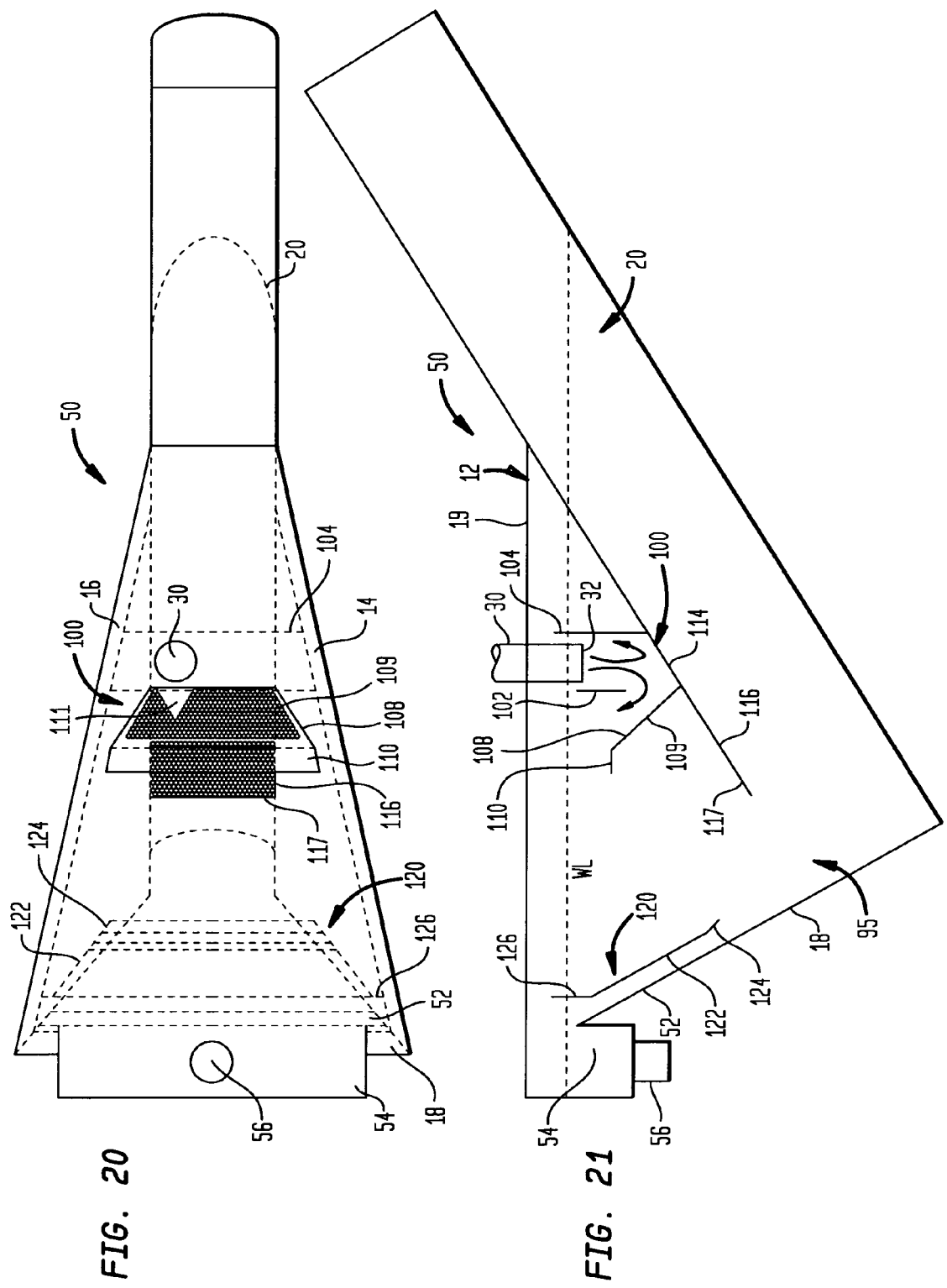
FIGS. 20 and 21 are top and side, respectively, plan views of an a second embodiment of the present invention utilized with a grit classifier tank assembly.

Referring to FIGS. 20 and 21, an embodiment of the present invention in use with a grit classifier tank assembly 50 will be described. The present invention includes a flow directing assembly 100 positioned adjacent the inlet pipe outlet 32 and a screw conveyor baffle plate 116 positioned above the screw conveyor 22. As described in conjunction with FIGS. 4 and 5, a weir plate 52 is positioned adjacent to the discharge box 54 and the inlet pipe outlet 32 is below the water level WL. As can be seen in FIGS. 20 and 21, the inlet pipe 30 is forward of center, front to rear. Such positioning is forward the typical inlet position of prior art classifier assemblies, and has been found to be more effective at providing a controlled flow within the tank 12.

The flow directing assembly 100 includes opposed solid plates 102 and 104 extending parallel to and on opposite sides of the inlet pipe 30. The plates 102 and 104 extend between the side walls 14, 16 of the tank 12 and prevent fluid flow directly forward or rearward. An angled plate portion 114 extends from plate 104 and extends opposite from the pipe outlet 32. As in the previous embodiment, the solid portions 102, 104 and 114 define a substantially U-shaped solid surface into which flow from the pipe outlet 32 is directed. Flow into the U-shaped solid surface causes the fluid to be rapidly redirected upward and outward, causing a rolling action in the fluid, with the majority of the fluid being forced to flow toward the rear, larger portion of the tank 12.

A rearwardly angled plate portion 108 extends from plate portion 114 and includes a plurality of through holes 109 except for a solid region 111 aligned with the inlet pipe 30. The solid region 111 defines a part of the U-shaped solid surface and prevents direct, uncontrolled flow out of the flow directing assembly 100. The flow out of the pipe outlet 32 is rapidly redirected by the solid portions 104, 111 and 114. The through holes 109 allow the redirected, dispersed flow to flow therethrough in a controlled manner with fluid contact with the plate portion 108 surface causing separation of some of the suspended material.

A solid plate portion 110 extends from the plate portion 108 to further encourage rearward flow of the fluid. A screw conveyor cover baffle portion 116 having through holes 117 extends from plate portion 108 and covers a portion of the screw conveyor trough 20. The through holes 117 allow controlled circulating flow of fluid in the quiescent zone 95 in the rear lower portion of the tank 12.

A solid baffle plate 120 is positioned adjacent the rear tank wall 18. The solid baffle plate 120 includes a portion 122 parallel to and spaced from the rear wall 18 to define a narrow flow path toward the discharge box 54. A lower portion of the plate 124 is preferably angled away from the wall 18 to define a larger entry area into the flow path. The inward angle of plate 124 also helps facilitate the rolling action of the fluid in the tank 12. An opposite end of the plate 126 extends substantially perpendicular to and above the water level WL to minimize the amount of direct flow into the discharge box 54. The configuration of the plate portions 124, 122, 126 define an inward concave shape that helps to promote the circular rolling flow within the tank 12.

The forced flow patterns and rolling action caused by the flow directing assembly 100 causes the inlet flow momentum to disperse rapidly. The flow directing assembly 100, the plates with through holes 109, 117 and the baffle plate 120, positioned properly in the tank provides a quiescent zone 95 with flow velocities within established target ranges which allows settling of finer mesh materials to take place in the bottom rear of the tank. The screw conveyor 22 is able to remove the settled grit particles without disruption caused by high velocity or turbulence in the removal zone. The classifier assembly 50 is not dependent upon large surface areas to diffuse the inlet velocity. As with the washer assembly 10, a tank 12 with a sufficient depth will provide the appropriate quiescent zone 95 to allow separation at the slower flow velocities while utilizing smaller tank volumes.

What is claimed is:

1. An assembly for removing grit from a fluid, the assembly comprising:
   a tank for holding the fluid for separation of grit from the fluid, the tank including a bottom having an upwardly inclined trough and a screw conveyor housed in the trough for removing grit, spaced sloped side walls converging downwardly to the trough, and a rear wall;
   a fluid inlet into the tank;
   a fluid discharge from the tank, the fluid discharge being spaced from the fluid inlet;
   a flow directing assembly positioned in the tank adjacent the fluid inlet and in spaced relation above the screw conveyor, the flow directing assembly including a substantially U-shaped surface opposite the fluid inlet such that fluid entering the tank through the inlet is caused to have a reversed flow in a direction more than 90 degrees from an inlet flow direction and away from the inlet and away from the screw conveyor, and
   at least one baffle plate having a plurality of through holes, the baffle plate positioned, with respect to the direction of flow of fluid, between the flow directing assembly and the fluid discharge.

2. The assembly of claim 1 wherein the fluid inlet includes a pipe extending along an axis and the substantially U-shaped surface is defined by a first plate portion parallel to the axis, a second plate portion extending from the first plate portion at an angle non-perpendicular to the axis and a third plate portion extending from the second plate portion at an angle non-perpendicular to the axis.

3. The assembly of claim 2 wherein the first, second and third plate portions are substantially solid surfaces.

4. The assembly of claim 1 wherein the flow directing assembly is configured to cause a fluid rolling action.

5. The assembly of claim 1 further comprising a discharge baffle positioned proximate the fluid discharge.

6. The assembly of claim 5 wherein the tank includes a rear wall and the fluid discharge is proximate the tank rear wall and wherein the discharge baffle includes a first plate parallel to and spaced from the rear wall.

7. The assembly of claim 6 wherein the discharge baffle further includes a second plate extending from the first plate such that the second plate is angled away from the tank rear wall.

8. The assembly of claim 7 wherein the discharge baffle further includes a third plate extending from the first plate such that the discharge baffle has an inward concave shape.

9. The assembly of claim 5 wherein the discharge baffle includes a plurality of through holes.

10. The assembly of claim 1 wherein a screw conveyor baffle is positioned proximate the trough to minimize fluid flow velocity adjacent to the screw conveyor.

11. The assembly of claim 10 wherein the screw conveyor baffle includes a plurality of through holes proximate a rear portion of the tank.

12. An assembly for removing grit from a fluid, the assembly comprising:
    a tank;
    a fluid inlet into the tank;
    a fluid discharge from the tank;
    a flow directing assembly positioned in the tank adjacent the fluid inlet, the flow directing assembly including a substantially U-shaped surface opposite the fluid inlet such that fluid entering the tank through the inlet is caused to have a reversed flow in a direction more than 90 degrees from an inlet flow direction,
    the fluid inlet including a pipe extending along an axis and the substantially U-shaped surface is defined by a first plate portion parallel to the axis, a second plate portion extending from the first plate portion at an angle non-perpendicular to the axis and a third plate portion extending from the second plate portion at an angle non-perpendicular to the axis, and
    wherein at least one of the first, second and third plate portions has at least one through holes.

13. The assembly of claim 12 wherein the third plate portion includes a plurality of through holes positioned about a solid surface portion aligned with the fluid inlet.

14. An assembly for removing grit from a fluid, the assembly comprising:
    a tank;
    a fluid inlet into the tank;
    a fluid discharge from the tank;
    a flow directing assembly positioned in the tank adjacent the fluid inlet, the flow directing assembly including a substantially U-shaped surface opposite the fluid inlet such that fluid entering the tank through the inlet is caused to have a reversed flow in a direction more than 90 degrees from an inlet flow direction,
    wherein the tank has a forward portion and the fluid discharge is in the forward portion of the tank, and
    wherein the flow directing assembly generally directs fluid entering through the fluid inlet toward a rear portion of the tank and wherein at least one flow baffle having a plurality of through holes is positioned between the rear of the tank and the fluid discharge.

* * * * *